J. E. JAMES & A. W. ADAMS.
VULCANIZING APPARATUS.
APPLICATION FILED MAY 1, 1918.

1,296,291.

Patented Mar. 4, 1919.
2 SHEETS—SHEET 1.

Inventors
Jesse E. James
Alfred W. Adams
By Watson E. Coleman
Attorney

J. E. JAMES & A. W. ADAMS.
VULCANIZING APPARATUS.
APPLICATION FILED MAY 1, 1918.
1,296,291.
Patented Mar. 4, 1919.
2 SHEETS—SHEET 2.
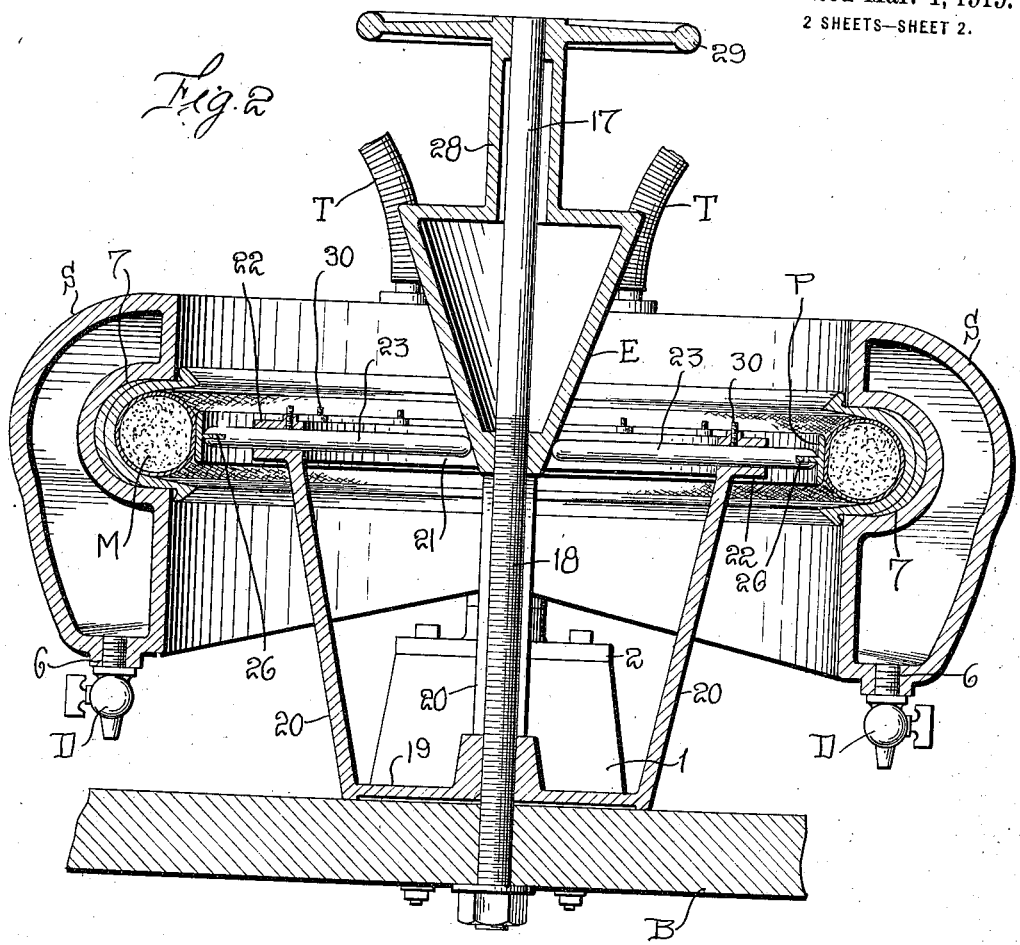
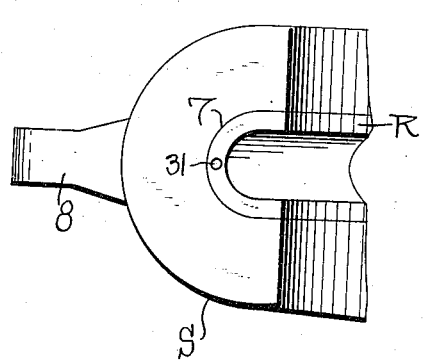
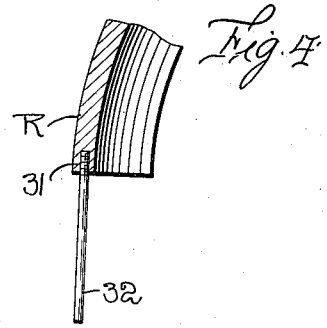
Inventors
Jesse E. James
Alfred W. Adams
By Watson E. Coleman
Attorney

UNITED STATES PATENT OFFICE.

JESSE E. JAMES AND ALFRED W. ADAMS, OF ALAMEDA, CALIFORNIA.

VULCANIZING APPARATUS.

1,296,291.

Specification of Letters Patent.  Patented Mar. 4, 1919.

Application filed May 1, 1918. Serial No. 231,884.

*To all whom it may concern:*

Be it known that we, JESSE E. JAMES and ALFRED W. ADAMS, citizens of the United States, residing at Alameda, in the county of Alameda and State of California, have invented certain new and useful Improvements in Vulcanizing Apparatus, of which the following is a specification, reference being had to the accompanying drawings.

This invention relates to certain improvements in vulcanizing apparatus and has relation more particularly to a device of this general character especially designed and adapted for use in the retreading of pneumatic tires as generally employed in connection with automobiles or similar vehicles and it is an object of the invention to provide a novel and improved apparatus of this general character whereby a tread may be properly vulcanized with the carcass of a tire without injury to the side walls or base of the carcass.

It is also an object of the invention to provide a novel and improved device of this general character including a mold and a pressing means coacting with the mold and which pressing means coacts with the carcass of the tire in a manner to impart the same pressure to the carcass at all points therearound during the vulcanizing operation.

Another object of the invention is to provide a novel and improved device of this general character including a mold consisting of two relatively movable sections together with means whereby the sections of the mold may be effectively held in assembled or operative relation and whereby each of said sections is provided with means whereby the same may be moved relative to the other with the possibility of injury, especially by heat, to the operator substantially entirely eliminated.

The invention consists in the details of construction and in the combination and arrangement of the several parts of our improved vulcanizing apparatus whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Fig. 2 is a vertical sectional view taken through our improved apparatus as herein disclosed with the work shown in applied position;

Fig. 3 is a fragmentary view in end elevation of one of the sections of the mold showing a reducing shell in applied position; and Fig. 4 is a fragmentary view partly in longitudinal section and partly in plan of a reducing shell and a coacting handle.

Figure 1:
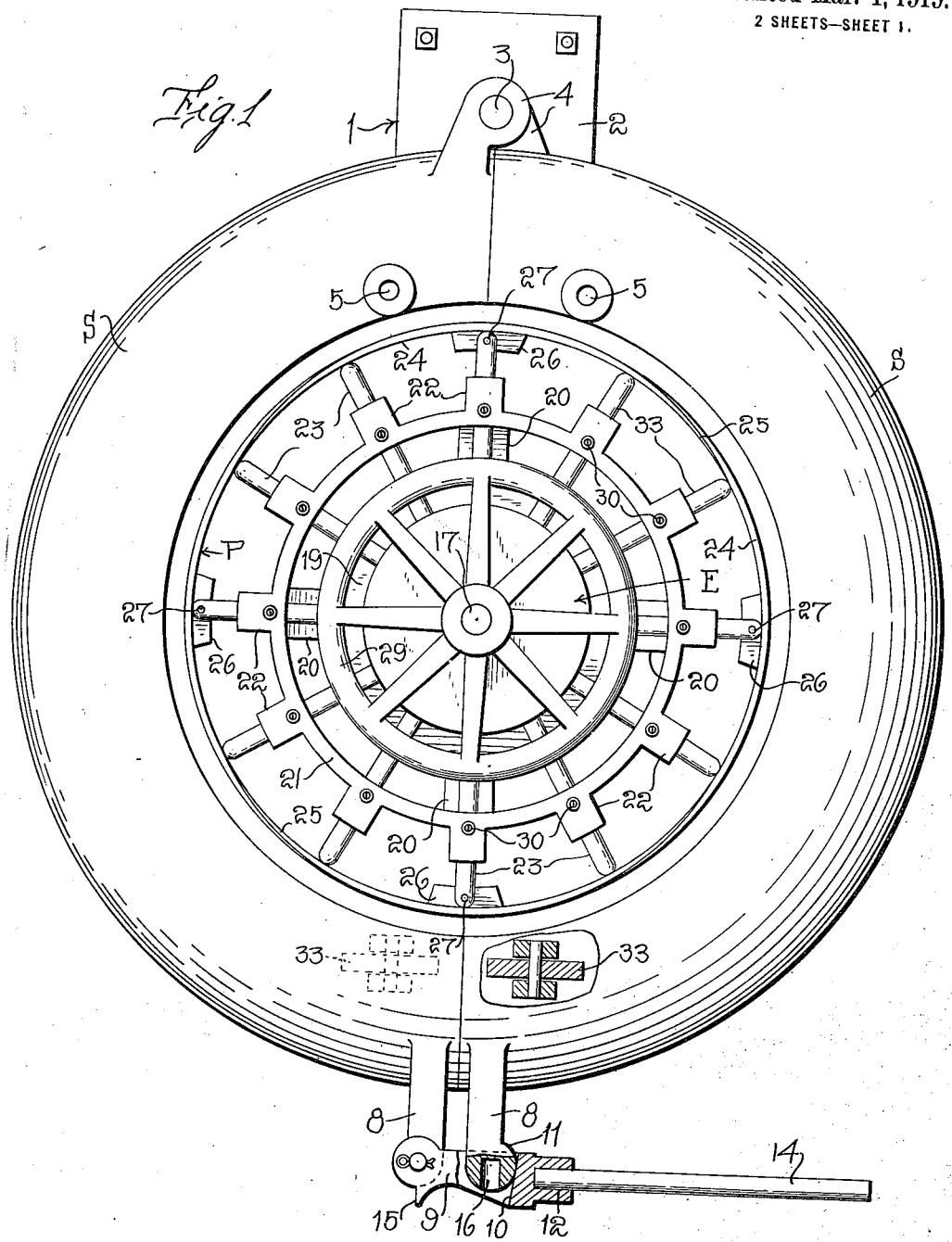
Figure 1 is a view in top plan, with portion broken away, of a vulcanizing apparatus constructed in accordance with our invention.

As disclosed in the accompanying drawings B denotes a supporting base provided with a block or bench 1. Secured to the upper face of the block or bench 1 is a plate 2 and extending upwardly from the plate is a pin 3 with which is pivotally engaged the outstanding ears 4 carried by the sections S of the mold.

Each of the sections S of the mold is semicircular in plan with the adjacent ends thereof abutting when the sections are in operative or closed relation. Each of the sections S is hollow to afford a steam chamber and the upper face of the section adjacent its pivoted end is provided with the inlet port 5 and the under face or wall of said section substantially midway thereof is provided with a discharge port 6. A flexible tube T leading from a suitable source of steam supply is in communication with the port 5 while the port 6 has in communication therewith a drain cock D of any desired type. The lower face or wall of the section S is inclined at opposite sides of the port 6 toward said port so that the water of condensation within the sections may be readily drained through the port 6. The inner end of each of the sections S is provided with the inbow or recess 7 extending from end to end and substantially semicircular in cross section. When the sections S are in closed or operative position the recesses or inbows 7 thereof are in continuity so that the tread portion of a tire casing or carcass may be readily arranged therein together with the tread to be applied to said casing or carcass. It is to be observed that the cross section configuration of each of the recesses 7 is such as to prevent injury to the side walls or beads of the casing or carcass.

The end portions of the sections remote from the pivoted end portions thereof are provided with the outstanding arms 8 and pivotally engaged with the outer end portion of one of the arms 8 is a locking member 9 having a cam face 10 engageable with the rounded head 11 in engagement with the second arm 8 whereby the sections S are effectively locked in operative or closed relation. The outer end portion of the member 9 is provided with a socket 12 in which is insertible an end portion of a lever 14 whereby the member 9 may be readily engaged or disengaged from the head 11. The pivoted end portion of the member 9 is also provided with a laterally directed shoulder or lug 15 engageable with the outer longitudinal side of the arm 8 with which the member 9 is engaged upon movement of the member 9 away from the second arm 8. By this means the section S with which the member 9 is operatively connected may be readily swung into open position through the medium of the lever 14 so that burning of the operator by contact with the section is substantially eliminated. The head 11 of the second member 8 is also provided with a socket 16 to receive the lever 14 so that the second section may be readily swung into open position with the same advantage as has been set forth relative to the first section S.

Extending upwardly from the supporting base B at substantially the axial center of the sections S when in operative or closed relation is a shank or rod 17 having its lower portion threaded. In threaded engagement with the shank or rod 17 and in contact with the supporting base B is a disk 19 provided at its peripheral portion with the upstanding arms 20. The upper end portions of the arms 20 are connected with the annular member 21 concentric to the sections S or more particularly the recesses 7 thereof when the sections are in their closed or operative relation. The annular member 21 is provided with a plurality of equidistantly spaced and radially disposed sleeves or bearings 22 through which are slidably disposed the arms or plungers 23. The outer end portions of the arms or plungers 23 coact with the annular pressing member P. The member P is herein disclosed as comprising a plurality of separable sections 24 having their adjacent end portions 25 in overlying relation. Each of the sections 24 is provided with an inwardly directed lip or lug 26 with which an arm or plunger 23 is positively connected as indicated at 27.

In practice it is preferred that the plungers or arms 23 be twelve in number with every fourth plunger or arm 23 positively connected to a section 24. The remaining flanges or arms 23 have their outer ends contacting with the inner face of said sections 23 of the member P.

E denotes an expander substantially in the form of an inverted cone with the apex thereof in threaded engagement with the portion 18 of the member 17 and the inner end portions of the plungers or arms 23 contacting with the periphery or outer wall of said member E. The upper or base portion or the upper end portion of the member E at its axial center is provided with an upwardly directed sleeve 28 having its outer extremity loosely contacting with the upper extremity of the shank or rod 17. The end portion of the sleeve 28 is provided upper extremity of the sleeve 28 is provided with a hand wheel 29 whereby the expander E may be rotated. Upon rotation of the expander E in one direction, the same passes downwardly and thereby forces the plungers or arms 23 outwardly. After the plungers or arms 23 have been forced outwardly to effect the desired pressure, as will hereinafter be more fully referred to, said plungers or arms 23 are held against retrograde movement by the set screws 30 threaded through the sleeves or bearings 22 and engaging the plungers or arms 23. By the use of the set screws 30 the expander E can be removed for use in connection with a second apparatus should the occasions of practice so require.

In practice after the casing or carcass of a tire and the tread to be applied thereto have been properly positioned within the recesses or inbows 7 an endless member M is then applied within the casing or carcass and said member consists of an endless bag preferably filled with sand. The expander E is then forced downwardly which results in the pressure member P imposing an even pressure at all points around the body or carcass of the tire. Steam is then admitted within the sections S of the mold and in practice it has been found that within substantially forty minutes the tread has been properly vulcanized to the casing or carcass of the tire.

In practice it is preferred that the recesses or inbows 7 be of a size to receive the tread portions of substantially the largest size of tire casing or carcass. When it is desired to use the device in connection with smaller tires a reducing shell R is inserted within each of the recesses or inbows. In order to facilitate the insertion or removal of said reducing shells the opposite ends thereof are provided with the recesses or sockets 31 and each of said sockets or recesses 31 is adapted to detachably receive a handle 32. Each of the handles 32 is removed after the reducing shell R has been applied in position.

In order to facilitate the swinging movement of the sections S of the mold, the end portions thereof remote from the pivoted ends of the sections have operatively engaged therewith the rollers 33, which ride upon the supporting base B or other supporting surface.

From the foregoing description, it is thought to be obvious that a vulcanizing apparatus constructed in accordance with our invention is particularly well adapted for use by reason of the convenience and facility with which it may be assembled and operated and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A vulcanizing apparatus including a mold, said mold comprising two sections connected at adjacent ends for relative swinging movement in a fixed path and in substantially a horizontal plane, and supporting means carried by the opposite end portions of the sections.

2. A vulcanizing apparatus including a mold, said mold comprising two sections connected at adjacent ends for relative swinging movement, and supporting wheels carried by the opposite end portions of the sections.

3. A vulcanizing apparatus including a mold, said mold comprising two sections, each of said sections being substantially semi-circular in form, the ends of said sections contacting when the sections are in assembled relation, and a member for pivotally connecting adjacent ends of the sections, said member also serving as a support for the mold.

4. A vulcanizing apparatus including a mold, said mold comprising two sections, each of said sections being substantially semi-circular in form, the ends of said sections contacting when the sections are in assembled relation, a member for pivotally connecting adjacent ends of the sections, said member also serving as a support for the mold, and coacting means carried by the opposite end portions of the sections for maintaining the same in assembled relation.

5. A vulcanizing apparatus including a mold, said mold comprising two sections, each of said sections being substantially semi-circular in form, the ends of said sections contacting when the sections are in assembled relation, a member for pivotally connecting adjacent ends of the sections, said member also serving as a support for the mold, and supporting wheels carried by the opposite end portions of the sections.

6. A vulcanizing apparatus comprising an annular mold provided in its inner face with a continuous recess to receive the work, an annular member arranged interiorly of the mold and concentric thereto, plungers slidably engaged with said annular member, a pressure member surrounding the annular member and concentric thereto, said pressure member comprising a plurality of separable sections, the outer ends of the plungers engaging the sections, certain of the plungers serving as supports for the sections, an expander coacting with the inner ends of the plungers, and means for locking the plungers against retrograde movement after the pressure member has been expanded.

7. A vulcanizing apparatus comprising a mold consisting of separable sections, each of said sections having its inner face provided with a work receiving recess extending from end to end, pressure means coacting with the mold, a reducing shell insertible within the recess of each of the sections, the ends of the shell being provided with sockets and handle members detachably engageable within said sockets.

In testimony whereof we hereunto affix our signatures in the presence of two witnesses.

JESSE E. JAMES.
ALFRED W. ADAMS.

Witnesses:
IDA A. JAMES,
VIRGINIA E. ADAMS.